UNITED STATES PATENT OFFICE.

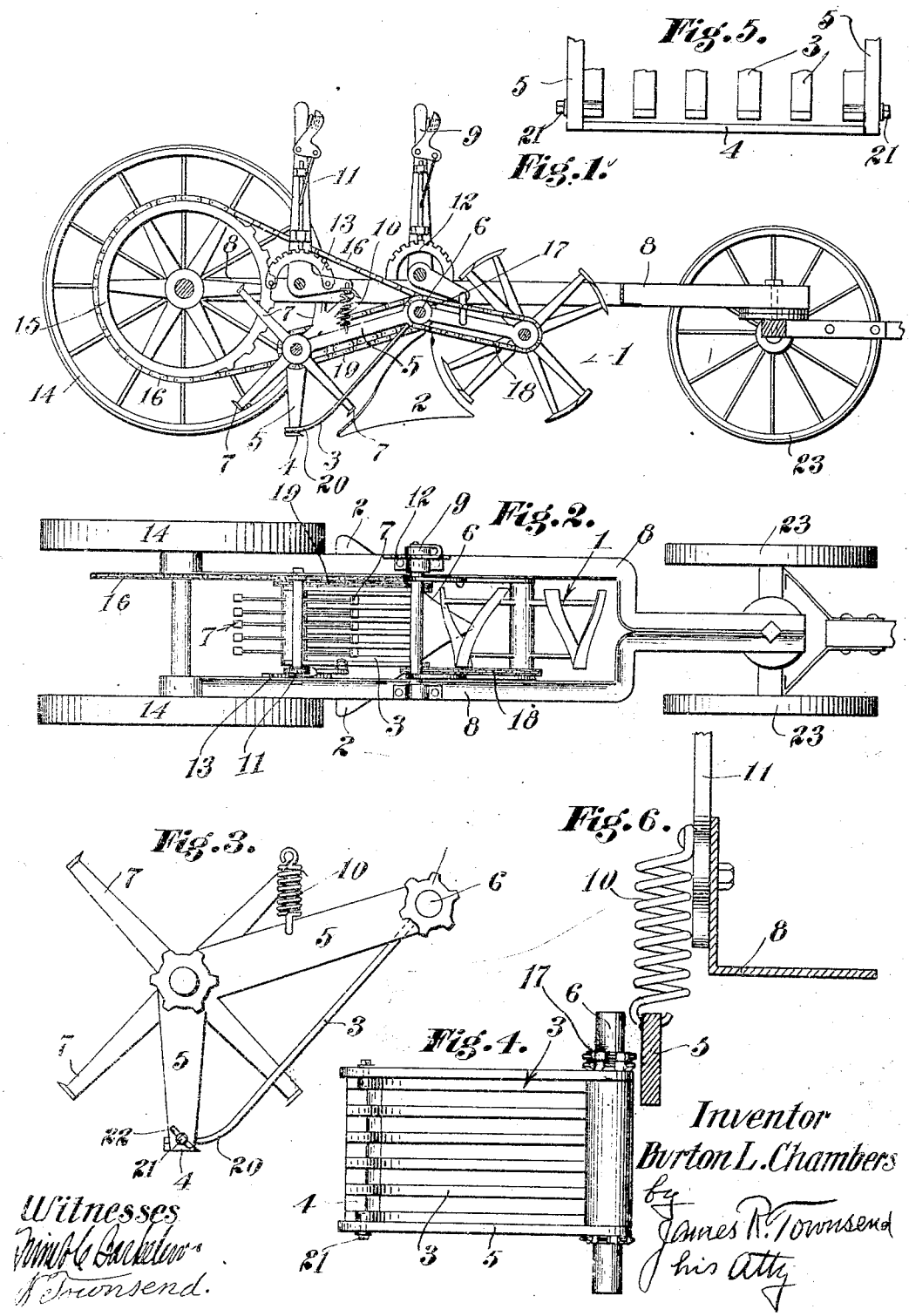

BURTON L. CHAMBERS, OF SAN JACINTO, CALIFORNIA.

BEET-TOPPER.

No. 835,600.  Specification of Letters Patent.  Patented Nov. 13, 1906.

Application filed August 15, 1905. Serial No. 274,266.

*To all whom it may concern:*

Be it known that I, BURTON L. CHAMBERS, a citizen of the United States, residing at San Jacinto, in the county of Riverside and State of California, have invented a new and useful Beet-Topper, of which the following is a specification.

An object of this invention is to prepare beets for harvesting.

In preparing sugar-beets for use in the manufacture of sugar it is necessary that the tops of the beets be sliced off. I propose to perform this work in the simplest, most convenient, and most economical manner. This I do by providing means for slicing the tops of the beets off while the beets are yet in the ground. In order to do this readily and without waste, I provide means for first cutting off the leaves of the beets and putting them out of the way, and then by other means I slice off the tops of the beets. I also provide means for keeping the slicing-knife clear.

The machine may be provided with one or more sets of operating devices, so as to operate upon one or more rows of beets at once. I shall illustrate the device as it appears constructed for operating on one row of beets at a time.

The accompanying drawings illustrate the invention.

Figure 1 is a sectional elevation of the machine, omitting the ground-wheels and portion of the frame on one side of the machine. Fig. 2 is a plan of the machine. Fig. 3 is a detail of the adjustable beet-slicing device with the means for keeping the knife clear. Fig. 4 is a plan of the same, omitting the knife-clearing device. Fig. 5 is an end elevation of the knife and lower ends of the runners. Fig. 6 is a fragmental view of the lever and spring for adjusting the pressure of the runners on the beets.

1 is a rotary cutter for cutting off the leaves of the beets; 2, a V-shaped share behind the cutter 1 for pushing the cut leaves of the beets out of the way at the side of the beet-row.

3 designates runners behind the share, and 4 a knife carried below said runners by a frame 5, said frame being adjustably fastened to the outer runners.

The runners are rigidly connected together and are pivoted on a shaft 6 and extend aslant rearwardly and downwardly toward the knife, so that as the machine moves forward the runners may contact with the tops of the beets and be lifted thereby, thus raising the frame 5 and its knife 4 to a determined height relative to the top of the beet upon which the runners may run. The space between the runners and knife will be such that the knife will slice off a predetermined portion of the top of the beet as the knife travels forward.

7 designates means in the form of arms carrying rotary cutters above the knife for keeping the space between the knife and the runners clear.

8 is a traveling frame carrying the cutter, the share, the runners, and said frame and rotary means. The rotary cutter for cutting off the leaves of the beets is vertically adjusted by means of lever 9.

It will be seen that the arms of the rotary means 7 are adapted to pass between the series of parallel runners 3 and the knives at the ends of said arms pass adjacent to the edge of knife 4 to clear the same. The runners 3 constitute means for automatically raising and lowering knife 4 and clearing means 7 at the same time.

The frame 5, which carries the knife-clearing means 7, is pivoted to the shaft 6, to which the runners 3 are pivoted, and the rear end thereof moves up and down with the rear ends of the runners.

10 is a spring fastened to the frame 5 and to a lever 11, pivoted on the frame 8 for adjusting the frame 5 vertically. The levers 9 and 11 are each provided with quadrants and catches 12 13 to hold the levers at the desired positions.

14 is the ground-wheel, and 15 a sprocket-wheel turned thereby to drive the sprocket-chain 16, which drives the sprocket-wheel 17, which drives the sprocket-chains 18 19, the first of which drives the front rotary cutter 1 and the second drives the rear rotary cutter or knife-clearing device 7.

The lower ends 20 of the runners are curved to form shoes, and means are provided for adjustably holding the same at a desired height above the knife 4. In Fig. 3 such means will be seen as a bolt 21 in the skit 22 in the frame 5. By loosening said bolt the runners 3 may be raised or lowered relative to the knife 4 and then secured in place by tightening the bolt.

It is to be understood that both sides of the frame 5 are preferably alike, and when it is desired to adjust the runners for a deeper or shallower cut both bolts or screws 21 will be loosened, whereupon the runners may be moved relative to the knife up or down, as the case may be.

In practical operation as the machine moves forward the front cutter 1 runs at a high speed, and the leaves of the beets will thereby be cut and afterward thrown aside by the share 2. Then as the machine advances one or more of the runners will run upon the tops of the beets thus relieved of their leaves, and as they run upon the tops of said beets they will raise the frame 5 and the knife 4, attached thereto. By adjusting the runners up or down relative to the knife any thickness of slice desired may be taken from the tops of the beets. The operator may at pleasure raise or lower the front rotary cutter 1 to cut off the leaves close to the tops of the beets. The rear beet-slicing frame 5 may also be raised or lowered, thus raising or lowering the knife, as desired. If the operator notes that sufficient pressure is not being exerted by the shoes or runners 3 upon the beets, he may push forward upon the handle 11, depressing spring 10 and pressing the frame down to hold the knife from bounding from the beets.

23 is the front carrying-wheel.

In case the operator finds that the runners are bearing down too heavily on the beets he will pull back on the lever 11, thus tending to lift the runners from the beets and relieving the pressure thereon.

By providing a main shaft 6 with chain-and-sprocket connections extending forwardly and rearwardly therefrom to rotate the rotary cutter 1 and the rotary clearing means 7 the strain on the shaft 6 necessary to operate said rotary knife and clearing means comes against the opposite sides of the shaft, so that the friction is lessened.

What I claim is—

1. A beet-topper provided with a knife, a series of parallel runners for raising and lowering said knife, said runners being adapted to engage the tops of the beets and to be lifted thereby, and rotating clearing means adapted to pass between said runners and adjacent to the knife's edge.

2. In a beet-topper, means for slicing off the top of the beets, comprising a series of parallel pivoted runners sloping rearwardly and downwardly, a knife spaced vertically beneath said runners and connected thereto to rise and fall therewith, and a rotary cutter comprising a series of arms adapted to pass between said parallel runners, said arms carrying at their ends knives adapted to pass adjacent to the first-mentioned knife to clear the same.

3. In a beet-topper, means for slicing off the top of the beets, comprising a series of parallel pivoted runners sloping rearwardly and downwardly, a knife connected to said runners to rise and fall therewith, and a rotary cutter comprising a series of arms adapted to pass between said parallel runners, said arms carrying at their ends knives adapted to pass adjacent to the first-mentioned knife to clear the same.

In testimony whereof I have hereunto set my hand, at Los Angeles, California, this 9th day of August, 1905.

BURTON L. CHAMBERS.

In presence of—
 JAMES R. TOWNSEND,
 JULIA TOWNSEND.